(12) United States Patent
Schroer (10) Patent No.: US 11,928,534 B2
(45) Date of Patent: Mar. 12, 2024

(54) METHOD OF USING AN RFID LABEL ON A HIGH-TEMPERATURE PRODUCT

(71) Applicant: Print Management Partners, Inc., Des Plaines, IL (US)

(72) Inventor: Dan Schroer, Wapakoneta, OH (US)

(73) Assignee: PRINT MANAGEMENT PARTNERS, INC., Des Plaines, IL (US)

( * ) Notice: Subject to any disclaimer, the term of this patent is extended or adjusted under 35 U.S.C. 154(b) by 0 days.

(21) Appl. No.: 17/746,770

(22) Filed: May 17, 2022

(65) Prior Publication Data

US 2023/0376716 A1 Nov. 23, 2023

(51) Int. Cl.
*G06K 19/02* (2006.01)
*G06K 19/077* (2006.01)

(52) U.S. Cl.
CPC ......... *G06K 19/02* (2013.01); *G06K 19/0776* (2013.01)

(58) Field of Classification Search
CPC ......... G06K 19/0772; G06K 19/07722; G06K 19/0773; G06K 19/07758; G06K 19/0776; G06K 19/025; G06K 19/027; G06K 19/07718; G06K 19/07749; A61B 90/90; A61B 90/98; G09F 3/10
USPC .............................. 235/492; 340/572.1, 572.8
See application file for complete search history.

(56) References Cited

U.S. PATENT DOCUMENTS

| | | | | |
|---|---|---|---|---|
| 4,713,273 A | * | 12/1987 | Freedman | B32B 38/0008 156/244.11 |
| 4,832,262 A | * | 5/1989 | Robertson | B60S 1/487 239/129 |
| 5,272,286 A | * | 12/1993 | Cain | F01N 1/22 381/71.7 |
| 6,383,449 B1 | * | 5/2002 | Pennekamp | B65B 55/025 422/1 |
| 6,648,232 B1 | | 11/2003 | Emmert | |
| 2003/0080917 A1 | | 5/2003 | Adams | |

(Continued)

FOREIGN PATENT DOCUMENTS

| | | |
|---|---|---|
| EP | 3 709 221 A1 | 9/2020 |
| JP | 2007231654 A * | 9/2007 |

(Continued)

OTHER PUBLICATIONS

Machine translation of JP 2019201318, European Patent Office, retrieved Feb. 25, 2023 (Year: 2023).*
Machine translation of JP 20192090959, European Patent Office, retrieved Feb. 23, 2023 (Year: 2023).*

(Continued)

*Primary Examiner* — Suezu Ellis
(74) *Attorney, Agent, or Firm* — NIXON PEABODY LLP (57) ABSTRACT

A method of using a high-temperature RFID label includes providing a label. The label includes a pressure-sensitive polymeric material, a liner, and an adhesive located between the pressure-sensitive polymeric material and the liner. An RFID tag is provided. The RFID tag includes an RFID chip or integrated circuit and an antenna. The RFID tag is located at least partially inside of the label to form the high-temperature RFID label. A portion of the liner is removed from the high-temperature RFID label. The high temperature RFID label is attached on a product. The product exceeds a temperature of at least about 300° F. The high-temperature RFID label is located outside of a periphery of the product. The RFID label may further include a printable top layer.

18 Claims, 5 Drawing Sheets

(56) References Cited

U.S. PATENT DOCUMENTS

| | | | | |
|---|---|---|---|---|
| 2004/0100415 | A1* | 5/2004 | Veitch | B01L 3/545 343/850 |
| 2006/0244597 | A1* | 11/2006 | Tethrake | A61F 2/4657 340/572.1 |
| 2007/0145150 | A1* | 6/2007 | Barczyk | G06K 19/07749 235/492 |
| 2008/0068175 | A1 | 3/2008 | Hockey | |
| 2008/0164326 | A1* | 7/2008 | Iwakata | G06K 19/0726 235/492 |
| 2009/0236429 | A1* | 9/2009 | Hioki | B31D 1/027 235/492 |
| 2011/0017832 | A1* | 1/2011 | Ritamaki | G06K 19/0775 235/492 |
| 2014/0015643 | A1 | 1/2014 | Shankman | |
| 2015/0053339 | A1* | 2/2015 | Ducharme | B32B 15/08 156/247 |
| 2016/0379103 | A1 | 12/2016 | Chou | |
| 2018/0296714 | A1* | 10/2018 | Higashiyama | A61L 2/14 |
| 2023/0177303 | A1* | 6/2023 | Ambartsoumian | G09F 23/00 235/492 |

FOREIGN PATENT DOCUMENTS

| | | | | |
|---|---|---|---|---|
| JP | 2019090959 | A | * | 6/2019 |
| JP | 2019090959 | A | | 6/2019 |
| JP | 2019201318 | A | * | 11/2019 |
| JP | 2019201318 | A | | 11/2019 |
| JP | 2021-151763 | | | 9/2021 |
| WO | WO 2019/175772 | | | 9/2019 |

OTHER PUBLICATIONS

Machine translation of JP 2007231654 from European Patent Office, retrieved Aug. 23, 2023 (Year: 2023).*

Lytle, M. J., "Flexy RFID tags can survive temperature extremes," TeehRadareom, available online at URL: https://global.techradar.com/en-ae/news/world-of-tech/future-tech/flexy-rfid-tags-can-survive-temperature-extremes-455243 ; Aug. 21, 2008.

HID Global, "HID © High Temperature Label—HID Global RFID Technology," available online at URL: https://www.hidglobal.com/products/rfid-tags/identification-technologies/high-temperature-label ; retrieved from the internet on Dec. 14, 2021.

RFID, Inc, "High Temperature RFID Tags," available online at URL: https://www.rfidinc.com/applications/extreme-temperature-rfid-tags/ ; retrieved from the internet on Dec. 14, 2021.

Avery Dennison, "A Game Changer for Pressure-sensitive Labels," available online at URL: https://label.averydennison.com/content/dam/averydennison/lpm- responsive/na/doc/product-overviews/product/intelligent-labels/rfid-inlay-portfolio/po-eu-intelligent-label-feature-story-en.pdf ; retrieved from the internet on Dec. 14, 2021.

Schreiner ProTech, "((rfid))-DistaFerr High Temp," available online at URL: https://www.schreiner-group.com/en/products/schreiner-protech-products/rfid-and-nfc/rfid-at-high-temperatures-up-to-230-c/rfid-distaferr-hightemp-uhf/Product/show.html retrieved from the internet on Dec. 14, 2021.

Specialty Tag & Label, Inc., "Thermal RFID Pressure Sensitive Labels," available online at URL: https://www.specialtytag.com/product/thermal-rfid-pressure-sensitive-labels/ ; retrieved from the internet on Dec. 14, 2021.

International Search Report and Written Opinion in International Application No. PCT/US2023/021181 dated Jun. 13, 2023, 12 pages.

* cited by examiner

METHOD OF USING AN RFID LABEL ON A HIGH-TEMPERATURE PRODUCT

FIELD OF THE INVENTION

This application is directed to an RFID label and a method of using an RFID label and, more specifically, is directed to a method of using a high-temperature RFID label to assist in tracking products.

BACKGROUND OF THE INVENTION

One problem in the metallic sheet industry is identifying tracking information of a product during its manufacturing process, especially products made under high temperatures. The manufacturing of the products can take several days to complete, and the products are typically moved several times during the cooling process. This tracking information typically would include details about the customer or the product. It would be desirable to have an efficient and cost-effective method of tracking the high-temperature product throughout the entire manufacturing process.

SUMMARY

According to one method, a high-temperature RFID label includes providing a label. The label includes a pressure-sensitive polymeric material, a liner, and an adhesive located between the pressure-sensitive polymeric material and the liner. An RFID tag is provided and includes an RFID chip or integrated circuit and an antenna. The RFID tag is located at least partially inside of the label to form the high-temperature RFID label. A portion of the liner is removed from the high-temperature RFID label. The high temperature RFID label is attached on a product. The product exceeds a temperature of at least about 300° F. The high-temperature RFID label is located outside of a periphery of the product.

According to one aspect of the present disclosure, the pressure-sensitive polymeric material comprises a polyimide.

According to a configuration of the above implementation, the adhesive comprises an acrylic adhesive, silicone adhesive, or a high-heat silicon-based material.

According to another configuration of the above implementation, the liner comprises a polyester.

According to a further configuration of the above implementation, the pressure-sensitive polymeric material comprises polyimides, the adhesive comprises an acrylic adhesive, silicone adhesive, or a high-heat silicon-based material, and the liner comprises a polyester.

According to a further configuration of the above implementation, the adhesive is an adhesive layer.

In a further aspect of the above implementation, the removing of the portion of the liner from the high-temperature RFID label is assisted by a line of weakness.

In a further aspect of the above implementation, the removing of the portion of the liner from the high-temperature RFID label leaves a portion of the liner that assists in protecting the RFID tag.

In yet a further aspect of the above implementation, the RFID tag is fully located inside of the label, and the RFID inlay is at an end of the high-temperature RFID label opposite of the product.

In yet a further aspect of the above implementation, the product is a metal roll or sheet. For example, the metal roll or sheet comprises steel or aluminum.

In yet a further aspect of the above implementation, the product has a temperature of from about 300° F. to about 1,000° F. The product in another embodiment has a temperature of from about 400° F. to about 1,000° F. The product in a further embodiment has a temperature of from about 500° F. to about 800° F.

According to another aspect of the present disclosure, a method of using a high-temperature RFID label includes providing a label. The label includes a pressure-sensitive polymeric material, a liner, an adhesive, and a printable top layer. The adhesive is located between the pressure-sensitive polymeric material and the liner. The pressure-sensitive polymeric material is located between the printable top layer and the adhesive. An RFID tag is provided and includes an RFID chip or integrated circuit and an antenna. The RFID tag is located at least partially inside of the label to form the high-temperature RFID label. A portion of the liner is removed from the high-temperature RFID label. The high temperature RFID label is attached on a product. The product exceeds a temperature of at least about 300° F. and the high-temperature RFID label is located outside of a periphery of the product.

According to a configuration of the above implementation, the printable top layer is a coating.

According to a configuration of the above implementation, the pressure-sensitive polymeric material comprises a polyimide.

According to another configuration of the above implementation, the adhesive comprises an acrylic adhesive, silicone adhesive, or a high-heat silicon-based material.

According to a further configuration of the above implementation, the liner comprises a polyester.

According to another aspect of the present disclosure, a high-temperature RFID label includes a pressure-sensitive polymeric material comprising at least one polyimide, a liner comprising polyester, an adhesive being located between the pressure-sensitive polymeric material and the liner. The adhesive comprises an acrylic adhesive, silicone adhesive or a high-heat silicon-based material. The high-temperature RFID label has a line of weakness extending substantially or completely through at least the liner to assist in removing a portion of the liner.

The above summary is not intended to represent each embodiment or every aspect of the present invention. Additional features and benefits of the present invention are apparent from the detailed description and figures set forth below.

BRIEF DESCRIPTION OF DRAWINGS

Other advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

This application describes a high-temperature RFID label and a method of using the high-temperature RFID label. The method includes providing a label. The label includes a pressure-sensitive polymeric material, a liner, and an adhesive located between the pressure-sensitive polymeric material and the liner. An RFID tag is provided and includes an RFID chip or integrated circuit and an antenna. The RFID tag is located at least partially inside of the label to form the high-temperature RFID label. A portion of the liner is removed from the high-temperature RFID label. The high temperature RFID label is attached on a product. The product exceeds a temperature of at least about 300° F. The high-temperature RFID label is located outside of a periphery of the product.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Figure 1A:
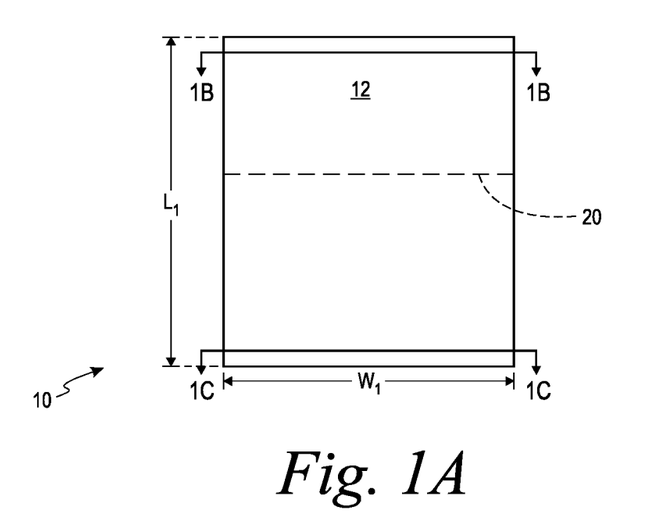
FIG. 1A is a top view of a label according to one embodiment.
Figure 1B:
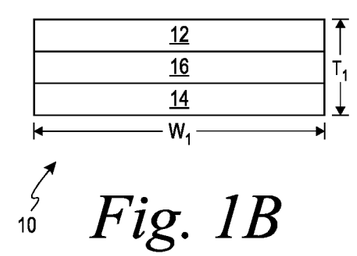
FIG. 1B is a cross-sectional view of the label of FIG. 1A taken generally across line 1B-1B.
Figure 1C:
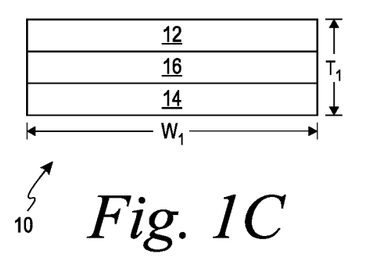
FIG. 1C is a cross-sectional view of the label of FIG. 1A taken generally across line 1C-1C.

Referring to FIGS. 1A-1C, a label 10 is shown according to one embodiment. The label 10 includes a pressure-sensitive polymeric material 12, a liner 14, and an adhesive 16. The adhesive 16 is located between the pressure-sensitive polymeric material 12 and the liner 14. The pressure-sensitive polymeric material 12 is also referred to as facestock. Each of the pressure-sensitive polymeric material 12, the liner 14 and the adhesive 16 extends across the width W1 and the length L1 of the label 10. As will be discussed below, it is noted that the thicknesses of the individual layers (e.g., the pressure-sensitive polymeric material 12, the liner 14 and the adhesive 16) are not drawn to scale in the drawings for improved clarity.

The pressure-sensitive polymeric material 12 is adapted to adhere and perform with products having high temperatures as will be discussed below. More specifically, the pressure-sensitive polymeric material 12 are configured and designed to adhere to products exceeding a temperature of at least about 300° F. or, more typically, at least about 500° F. with assistance from the adhesive 16. It is also contemplated that the pressure-sensitive polymeric materials may be designed to allow for printing on its surface.

One non-limiting example of a pressure-sensitive polymeric material comprises polyimides, polyesters, or combinations thereof. It is contemplated that other polymeric materials may be used in forming the pressure-sensitive polymeric material.

In one embodiment, the pressure-sensitive polymeric material 12 has a thickness of from about 1.5 to about 7 mils. In another embodiment, the pressure-sensitive polymeric material 12 has a thickness of from about 2 to about 6 mils. In a further embodiment, the pressure-sensitive polymeric material 12 has a thickness of from about 3 to about 5 mils.

The liner 14 is adapted to withstand the high temperature environment associated with the products. As will be discussed below, the liner in one embodiment is not adhered directly to the product, but is located adjacent to the product having a high temperature.

In one embodiment, the liner 14 comprises polymeric material. Non-limiting examples of polymeric materials that may be used in forming the liner is a polyester. It is contemplated that other polymeric materials may be used in forming the liner that can withstand the high indirect temperatures. It is contemplated that non-polymeric material that is not flammable may also be used in forming a liner.

In one embodiment, the liner 14 has a thickness of from about 0.5 to about 2 mils. In another embodiment, the liner 14 has a thickness of from about 0.5 to about 1.5 mil.

As will be discussed below, a portion of the liner 14 is adapted to be removed before being attached to the product having a high temperature. To assist in removing a portion of the liner 14, the label 10 includes a line of weakness 20 as shown in FIG. 1A. The line of weakness 20 extends across the width W1 of the label 10. The line of weakness 20, however, extends at least substantially through the liner 14 and, more desirably, extends completely through the liner 14. The line of weakness 20 can extend into the adhesive 16, but desirably does not extend into and certainly not through the pressure-sensitive polymeric material 12.

The line of weakness 20 typically is a slit that extends at least substantially or completely through the liner 14. It is contemplated that other line of weaknesses may be used including scoring or scored lines, bridges, notches, leaders, nicks or other lines of weaknesses that will separate the liner into two portions.

The properties of the adhesive 16 are designed and configured to obtain maximum and desirable adhesive properties, while still functioning within the temperature limits of the products. Thus, the adhesive needs to function with the high temperatures of the product for which it is adhered to. Non-limiting examples of materials that may be used in forming the adhesive include acrylic adhesive, silicone adhesive, and high-heat silicon-based materials. It is contemplated that other adhesive materials may be used that can function with the high temperatures of the product.

The form of the adhesive 16 may be a layer or a coating in the label 10. In one embodiment, an adhesive 16 may be in a form of a layer that extends the entire length L1 and the width W1 of the label, such as shown in FIG. 1A. In another embodiment, an adhesive may be present in a portion of the entire length and/or width of the label. For example, an adhesive may be in a form of a continuous layer that extends less than the width of a label.

Similarly, in another embodiment, an adhesive coating may extend the entire length L1 and the width W1 of a label. In another embodiment, an adhesive coating may be present in a portion of the length and/or width of a label.

According to one exemplary embodiment, the pressure-sensitive polymeric material 12 includes a polyimide, the liner 14 includes a polyester, and the adhesive 16 includes a high-heat silicon-based material (e.g., an acrylic silicone).

It is contemplated that additional material may be located between the adhesive and the liner to assist in more easily removing the liner from the adhesive. This additional material may be in the form of, for example, a layer or a coating. One non-limiting example of material that may be located between the adhesive and the liner is a silicone. It is contemplated that other materials may be used between the adhesive and the liner including non-silicone materials.

The size of the label 10 shown in FIG. 1A can vary. In one embodiment, the label 10 has the width W1 of from about 3 to about 10 inches, and the length L1 of from about 4 to about 12 inches. In another embodiment, the label 10 has the width W1 of from about 3 to about 8 inches, and the length L1 of from about 5 to about 10 inches. In a further embodiment, the label 10 has the width W1 of from about 4 to about 6 inches, and the length L1 of from about 5 to about 8 inches.

In one embodiment, the thickness T1 of the label 10 shown in FIG. 1B is from about 4 to about 15 mils. In another embodiment, the thickness T1 of the label 10 is from about 5 to about 10 mils. In a further embodiment, the thickness T1 of the label 10 is from about 5 to about 8 mils. One non-limiting example of a label 10 is about 4.5 inches in width W1, 6 inches in length L1, and about 8 mils in thickness T1.

The shape of the label may also vary. The shape of the label in one embodiment is polygonal. Some non-limiting examples of polygonal shapes include rectangular or square. In another embodiment, the shape of the label may be a non-polygonal shape.

Figure 2:
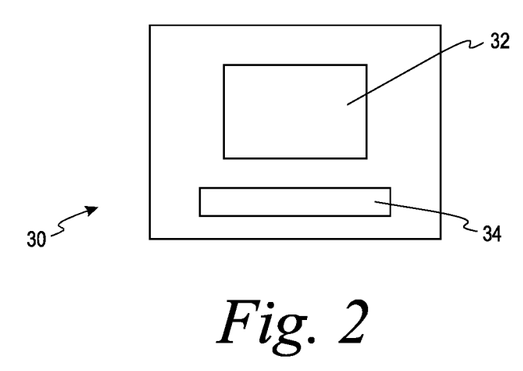
FIG. 2 is a top view of a RFID tag according to one embodiment.

Referring to FIG. 2, a radio frequency identification (RFID) tag 30 is shown according to one embodiment. The RFID tag 30 includes an RFID chip or integrated circuit 32 and an antenna 34.

The chip or integrated circuit 32 is operatively connected with the antenna 34. The chip or integrated circuit 32 stores information. The RFID tag 30 is shown in FIG. 2 as including an inlay, which assists in keeping the remaining portions of the tag together. Thus, the RFID tag can also be referred to as an RFID inlay.

The RFID tag 30 may store a variety of information in its chip or integrated circuit 32. The information in the chip or integrated circuit 32 is typically information directed to the product. For example, the information that may be stored includes the customer's name, the type and size of the product, a material identification number (i.e., a serial or lot number), important dates, purchase order number, production date, and other identification information. The information assists in tracking the product throughout the manufacturing process.

Referring still to FIG. 2, the antenna 34 is an antenna that assists in communicating and interfacing with equipment regarding the information stored in the chip or integrated circuit 32. The antenna 34 provides the desired interface with the equipment such that the equipment can retrieve the electronic information carried by the chip or integrated circuit 32. In one embodiment, the antenna is configured to receive remote input information from, for example, a printer.

The equipment may be a suitable reading device or scanner. The reading device or scanner (not shown) includes one or more antennas to receive information from the chip or integrated circuit 32 in the high-temperature RFID label 50 discussed below. The reading device or scanner can track the product from production to shipping. The cooling process of the products can take several days to complete in some methods, and the products are typically moved several times during the cooling process.

The antenna 34 typically comprises at least one metal. Non-limiting examples of metals that may be used in forming the antenna are aluminum and copper. It is contemplated that other metals or conductive material may be used in forming the antenna.

In one embodiment, the antenna 34 cooperates with the chip or integrated circuit 32 to be externally powered without physical connection to a power supply. In this embodiment, the chip or integrated circuit is a passive implementation that must receive a signal to be activated.

It is contemplated that other wireless solutions may work in communicating information stored on the chip or integrated circuit. Although much less desirable because of the environmental conditions and the cost, it is contemplated that an active system in which a power supply (e.g., a battery) is included may be used.

The RFID tag is located at least partially inside of the label to form a high-temperature RFID label. In a further embodiment, the RFID tag is desirably fully located inside of the label in forming the high temperature RFID label.

Figure 3A:
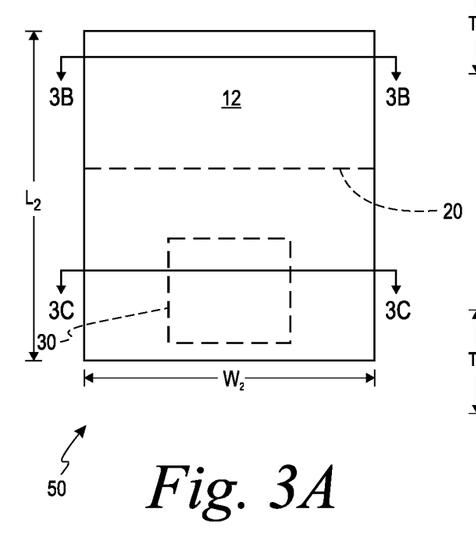
FIG. 3A is a top view of a high-temperature RFID label according to one embodiment.
Figure 3B:
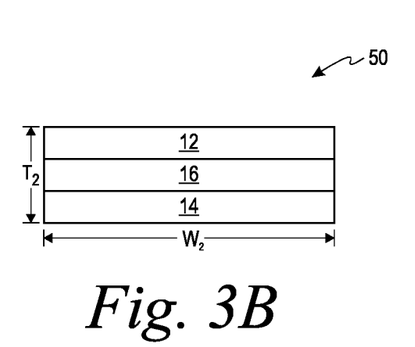
FIG. 3B is a cross-sectional view of the RFID label of FIG. 3A taken generally across line 3B-3B.
Figure 3C:
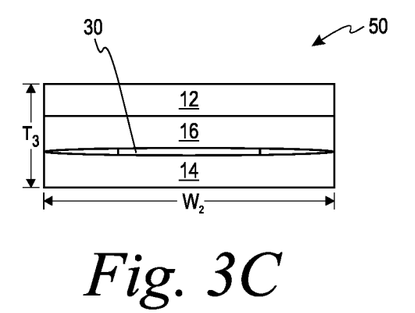
FIG. 3C is a cross-sectional view of the RFID label of FIG. 3A taken generally across line 3C-3C.

Referring to FIGS. 3A-3C, a high-temperature RFID label 50 is shown according to one embodiment and includes the pressure-sensitive polymeric material 12, the liner 14, the adhesive 16, and the RFID tag 30. The RFID tag 30 is located between the liner 14 and the adhesive 16 as shown best in FIG. 3C. The adhesive 16 is located between the pressure-sensitive polymeric material 12 and the RFID tag 30 in one portion, and between the pressure-sensitive polymeric material 12 and the liner 14 in another portion.

The width W2 and the length L2 of the high-temperature RFID label 50 in FIG. 3A are the same as the width W1 and the length L1 from FIG. 1A. As shown in FIG. 3C, the RFID tag 30 does not extend across the entire width W2 of the high-temperature RFID label 50. In other embodiment, the RFID tag may extend across the entire width of the high-temperature RFID label. The RFID tag 30 will not extend above or through the line of weakness 20 shown in FIG. 3A.

The thickness of the high-temperature RFID label 50 can vary in different portions. For example, a thickness T2 is shown in FIG. 3B that is the same as the thickness T1 from FIGS. 1B, 1C. The high-temperature RFID label 50 includes a thickness T3 in FIG. 3C that is slightly thicker than T2 because of the RFID tag 30. Before the high-temperature RFID label 50 is applied to a product, a portion of the liner 14 is removed exposing the adhesive 16 on a portion thereof.

Figure 4A:
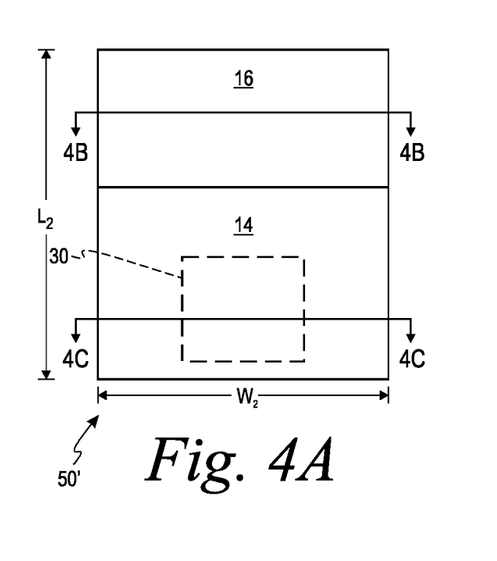
FIG. 4A is a bottom view of the high-temperature RFID label of FIG. 3A after removal of a portion of the label according to one embodiment.
Figure 4B:
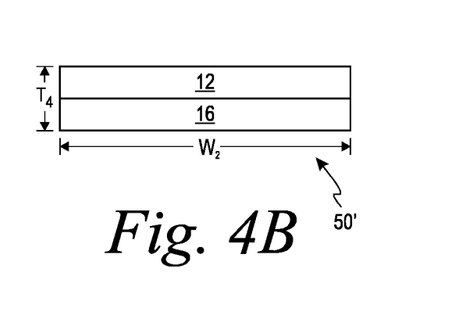
FIG. 4B is a cross-sectional view of the RFID label of FIG. 4A taken generally across line 4B-4B.
Figure 4C:
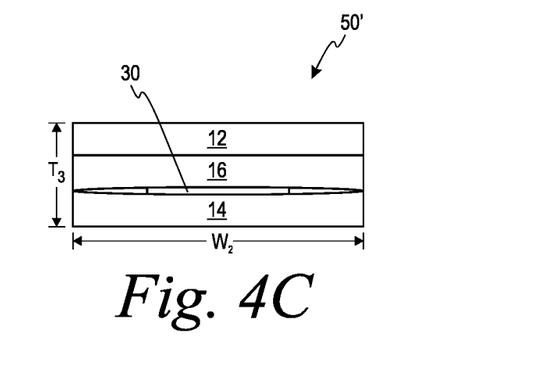
FIG. 4C is a cross-sectional view of the RFID label of FIG. 4A taken generally across line 4C-4C.

Referring to FIGS. 4A-4C, a bottom perspective view of a high-temperature RFID label 50' is shown with a portion of the liner 14 having been removed. The portion of the liner 14 that has been removed is the portion that is located above the line of weakness 20 shown in, for example, FIG. 3A. Thus, a portion of the adhesive 16 is exposed on a bottom surface and configured to being secured directly to a product.

The thickness of the high-temperature RFID label 50' can vary in different portions. For example, a thickness T4 is shown in FIG. 4B. The high-temperature RFID label 50' includes a thickness T3 in FIG. 4C that is thicker than T4 because of the RFID tag 30 and the liner 14.

The portion of the liner may be removed and attached to a product manually by a user, which is typically performed with a tool because of the high temperatures involved. In another embodiment, a portion of the liner 14 is removed automatically by machinery.

Figure 5A:
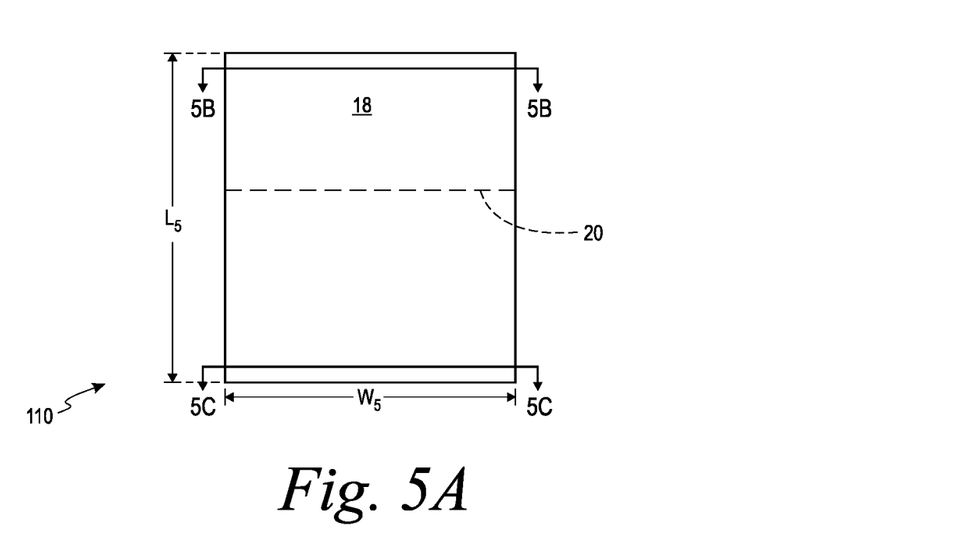
FIG. 5A is a top view of a label according to another embodiment.
Figure 5B:
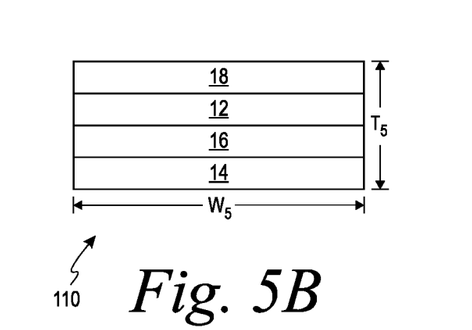
FIG. 5B is a cross-sectional view of the label of FIG. 5A taken generally across line 5B-5B.
Figure 5C:
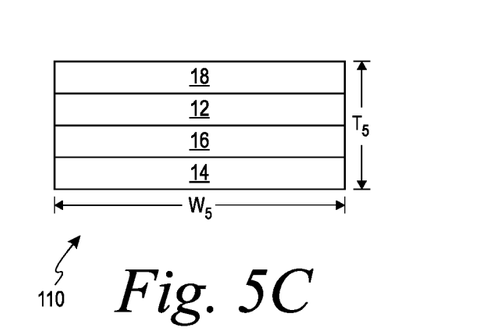
FIG. 5C is a cross-sectional view of the label of FIG. 5A taken generally across line 5C-5C.

Referring to FIGS. 5A-5C, a label 110 is shown according to another embodiment in a top perspective view. The label 110 includes the pressure-sensitive polymeric material 12, the liner 14, the adhesive 16, and a printable top layer 18. The adhesive 16 is located between the pressure-sensitive polymeric material 12 and the liner 14. The printable top layer 18 is located next to the pressure-sensitive polymeric material 12. Each of the pressure-sensitive polymeric material 12, the liner 14, the adhesive 16, and the printable top layer 18 extends across the width W5 and the length L5 of the label 110. The label 110 is the same as the above described label 10 except for the addition of the printable top layer 18. The label 110 functions the same as the above described label 10, including the ability to add a RFID tag (e.g., RFID tag 30) to form a high-temperature RFID label, as discussed below with respect to FIG. 6B.

The printable top layer 18 provides an improved surface for printing information on the label 110. The printable top layer is typically a coating. It is contemplated, however, that the printable top layer may be formed as an individual layer. The thickness of the printable top layer 18 is at least 0.1 mil. In one embodiment, the thickness of the printable top layer 18 is from about 0.1 to about 1.0 mil. In another embodiment, the thickness of the printable top layer 18 is from about 0.1 to about 0.3 mil.

Figure 6A:
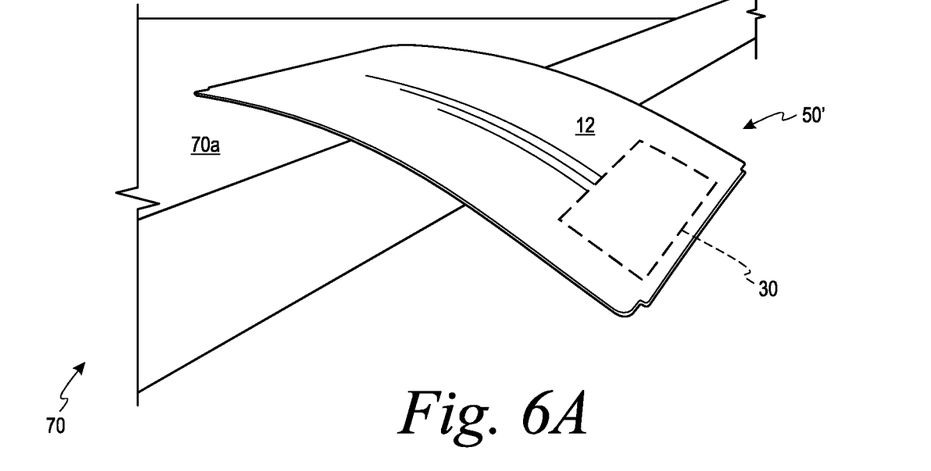
FIG. 6A is a top perspective view of the high-temperature RFID label of FIG. 4A attached to a product according to one embodiment.

Referring to FIG. 6A, the high-temperature RFID label 50' is shown applied to a product 70. At least a portion of the exposed adhesive 16 of the high-temperature RFID label 50' is directly applied to a top surface 70a of the product 70. The portion of the high-temperature RFID label 50' located outside of a periphery of the product 70 includes the RFID tag 30. More specifically, the RFID tag 30 is at the end of the high-temperature RFID label 50' opposite of where the adhesive 16 is attached to the product 70. This portion of the high-temperature RFID label 50' is referred to as a flag-off label configuration. Thus, the high-temperature RFID label 50' is positioned in a location to assist in both the RFID chip or integrated circuit 32 and antenna 34 surviving the extreme heat associated with the product and the environment in which the product is manufactured. This positioning assists in dissipating damaging heat levels before overwhelming the RFID tag 30. The remaining portion of the liner 14 assists in protecting the RFID tag 30 in this environment. The high-temperature RFID label 50' and the location of the RFID tag 30 allows equipment (e.g., suitable reading device or scanner) to receive its signal throughout the manufacturing process, including the cooling steps.

The label 110 described in FIGS. 5A-5C with the addition of a RFID tag (e.g., RFID tag 30) between the adhesive 16 and the liner 14 could be applied to a top surface of a product in the same manner as the label 10 except the printable top layer 18 is included in the label 110.

Figure 6B:
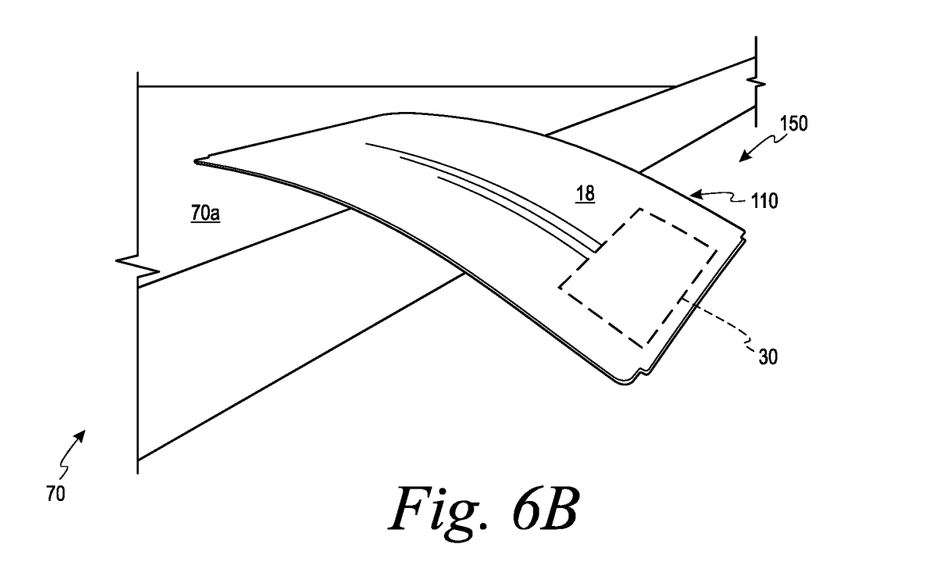
FIG. 6B is a top perspective view of a high-temperature RFID label including the label of FIG. 5A attached to a product according to another embodiment.

Referring to FIG. 6B, a high-temperature RFID label 150 is shown applied to the product 70. The high-temperature RFID label 150 includes the label 110 of FIGS. 5A-5C and the RFID tag 30. At least a portion of the exposed adhesive 16 of the high-temperature RFID label 150 is directly applied to the top surface 70a of the product 70. The portion of the high-temperature RFID label 150 located outside of a periphery of the product 70 includes the RFID tag 30. More specifically, the RFID tag 30 is at the end of the high-temperature RFID label 150 opposite of where the adhesive 16 is attached to the product 70. The high-temperature RFID label 150 is positioned in a location to assist in both the RFID chip or integrated circuit 32 and antenna 34 surviving the extreme heat associated with the product and the environment in which the product is manufactured. The remaining portion of the liner 14 assists in protecting the RFID tag 30 in this environment.

The product 70 is typically a metal and is in a form of a roll, sheet or plate. The metal sheet may be a variety of materials. Some non-limiting examples of materials that can form the metal roll or sheet include steel or aluminum. It is contemplated that the product may comprise other metals that can be of higher temperatures.

It is contemplated that the product may be a non-metallic material that is capable of being heated past about 300° F. It is also contemplated that the product may be a non-metallic material that is capable of being heated past about 500° F. Some non-limiting examples of the same include ceramics.

The process of forming the label may be performed by different methods. In one method, the process includes continuous streams of pressure-sensitive polymeric material, liner and an adhesive being located therebetween. In one method of forming a high-temperature RFID label, the RFID tag is inserted into the label to form the high-temperature RFID label. This is typically performed by a converter automatically. It is contemplated that other methods may be used in forming the label and the high-temperature RFID label.

A method of using a high-temperature RFID label includes providing a label. The label includes a pressure-sensitive polymeric material, a liner, and an adhesive located between the pressure-sensitive polymeric material and the liner. An RFID tag is provided and includes an RFID chip or integrated circuit and an antenna. The RFID tag is located at least partially inside of the label to form the high-temperature RFID label. A portion of the liner is removed from the high-temperature RFID label. The high temperature RFID label is attached on a product. The product exceeds a temperature of at least about 300° F. The high-temperature RFID label is located outside of a periphery of the product.

In one embodiment, the product has a temperature of at least 350° F., and in another embodiment, the product has a temperature of at least 400° F. In a further embodiment, the product has a temperature of at least 450° F., and in another embodiment, the product has a temperature of at least 500° F.

In one embodiment, the product has a temperature of from about 300° F. to about 1,000° F. In another embodiment, the product has a temperature of from about 400° F. to about 1,000° F. In a further embodiment, the product has a temperature of from about 500° F. to about 1,000° F. In another embodiment, the product has a temperature of from about 400° F. to about 800° F., or from about 400° F. to about 750° F. In another embodiment, the product has a temperature of from about 450° F. to about 800° F., or from about 450° F. to about 750° F. In a further embodiment, the product has a temperature of from about 500° F. to about 800° F., or from about 500° F. to about 750° F. In yet another embodiment, product has a temperature of from about 550° F. to about 750° F. It is also contemplated that the product has a temperature of from about 600° F. to about 750° F., or of from about 550° F. to about 750° F.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of using a high-temperature radio frequency identification (RFID) label, the method comprising:
providing a label, the label including a pressure-sensitive polymeric material, a liner, and an adhesive located between the pressure-sensitive polymeric material and the liner;
providing an RFID tag, the RFID tag including an RFID chip or integrated circuit and an antenna, the RFID tag being located at least partially inside of the label to form the high-temperature RFID label;
removing a portion of the liner from the high-temperature RFID label; and
attaching the high temperature RFID label on a product during the manufacturing of the product, the product exceeding a temperature of at least 500° F. during the attaching, the high-temperature RFID label being located outside of a periphery of the product.

2. The method of claim 1, wherein the pressure-sensitive polymeric material comprises a polyimide.

3. The method of claim 1, wherein the adhesive comprises an acrylic adhesive, silicone adhesive, or a high-heat silicon-based material.

4. The method of claim 1, wherein the liner comprises a polyester.

5. The method of claim 1, wherein the pressure-sensitive polymeric material comprises polyimides, the adhesive comprises an acrylic adhesive, silicone adhesive, or a high-heat silicon-based material, and the liner comprises a polyester.

6. The method of claim 1, wherein the adhesive is an adhesive layer.

7. The method of claim 1, wherein the removing the portion of the liner from the high-temperature RFID label is assisted by a line of weakness.

8. The method of claim 1, wherein the removing the portion of the liner from the high-temperature RFID label leaves a portion of the liner that assists in protecting the RFID tag.

9. The method of claim 1, wherein the RFID tag is fully located inside of the label, and wherein the RFID tag is at an end of the high-temperature RFID label opposite of the product.

10. The method of claim 1, wherein the product is a metal roll or sheet.

11. The method of claim 10, wherein the metal roll or sheet comprises steel or aluminum.

12. The method of claim 1, wherein the product has a temperature of from 500° F. to about 1,000° F.

13. The method of claim 12, wherein the product has a temperature of from 500° F. to about 800° F.

14. A method of using a high-temperature radio frequency identification (RFID) label, the method comprising:
providing a label, the label including a pressure-sensitive polymeric material, a liner, an adhesive, and a printable top layer, the adhesive located between the pressure-sensitive polymeric material and the liner, the pressure-sensitive polymeric material being located between the printable top layer and the adhesive;
providing an RFID tag, the RFID tag including an RFID chip or integrated circuit and an antenna, the RFID tag being located at least partially inside of the label to form the high-temperature RFID label;
removing a portion of the liner from the high-temperature RFID label; and
attaching the high temperature RFID label on a product during the manufacturing of the product, the product exceeding a temperature of at least 500° F. during the attaching, the high-temperature RFID label being located outside of a periphery of the product.

15. The method of claim 14, wherein the printable top layer is a coating.

16. The method of claim 14, wherein the pressure-sensitive polymeric material comprises a polyimide.

17. The method of claim 14, wherein the adhesive comprises an acrylic adhesive, silicone adhesive, or a high-heat silicon-based material.

18. The method of claim 14, wherein the liner comprises a polyester.

* * * * *